United States Patent
Schaufler et al.

(10) Patent No.: US 10,241,888 B2
(45) Date of Patent: Mar. 26, 2019

(54) METHOD TO VERIFY CORRECTNESS OF COMPUTER SYSTEM SOFTWARE AND HARDWARE COMPONENTS AND CORRESPONDING TEST ENVIRONMENT

(71) Applicant: INTERNATIONAL BUSINESS MACHINES CORPORATION, Armonk, NY (US)

(72) Inventors: Ralf Schaufler, Boeblingen (DE); Tobias Senner, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1488 days.

(21) Appl. No.: 14/082,543

(22) Filed: Nov. 18, 2013

(65) Prior Publication Data
US 2014/0278334 A1 Sep. 18, 2014

(30) Foreign Application Priority Data
Mar. 18, 2013 (GB) .................................. 1304892.1

(51) Int. Cl.
*G06F 11/34* (2006.01)
*G06F 11/36* (2006.01)
*G06F 11/26* (2006.01)

(52) U.S. Cl.
CPC ........ *G06F 11/3461* (2013.01); *G06F 11/261* (2013.01); *G06F 11/3476* (2013.01); *G06F 11/3668* (2013.01)

(58) Field of Classification Search
CPC ............. G06F 11/3668; G06F 11/3476; G06F 11/261; G06F 11/36
See application file for complete search history.

(56) References Cited

U.S. PATENT DOCUMENTS 5,845,064 A * 12/1998 Huggins ............. G06F 17/5022
714/26
6,285,914 B1 9/2001 Bae et al.
(Continued)

FOREIGN PATENT DOCUMENTS

GB 2 512 054 A 9/2014

OTHER PUBLICATIONS

Baumgartner et al., "Scalable Sequential Equivalence Checking Across Arbitrary Design Transformations", International Conference on Computer Design, UC Berkeley EECS, San Deigo, CA, Oct. 2006 (8 pages).

*Primary Examiner* — Eunhee Kim
(74) *Attorney, Agent, or Firm* — Margaret A. McNamara, Esq.; Kevin P. Radigan, Esq.; Heslin Rothenberg Farley & Mesiti P.C.

(57) ABSTRACT

A method is presented to verify correctness of computer system software and hardware components. The method includes: operating a test environment with a verified system software and hardware version; monitoring and recording each hardware access during operation of the test environment with the verified system software and hardware version to generate a corresponding verified trace file; operating the test environment with a modified system software and/or hardware version; monitoring and recording each hardware access to generate a corresponding new trace file during operation of the test environment with the modified system software and/or hardware version; defining an arbitrary order for target chips in the verified and the modified hardware model or hardware system version; sorting sequences of entries in both trace files according to the target chip order; and comparing the sorted trace files by comparing their entries each by each and outputting a corresponding comparison result.

16 Claims, 6 Drawing Sheets

(56) References Cited

U.S. PATENT DOCUMENTS 7,219,315 B1 5/2007 Stoye et al.
2012/0158394 A1 6/2012 Cho et al.

* cited by examiner

| Timestamp | Operation Type | Target Chip | Operation Data |
|---|---|---|---|
| 1 | X | A | X1 |
| 2 | Y | B | Y1 |
| 3 | Z | A | Z1 |
| 4 | X | B | X2 |
| 5 | Y | A | Y2 |
| 6 | Z | C | Z2 |
| 7 | X | B | X3 |

| Timestamp | Operation Type | Target Chip | Operation Data |
|---|---|---|---|
| 1 | X | A | X1 |
| 3 | Z | A | Z1 |
| 5 | Y | A | Y2 |

| Timestamp | Operation Type | Target Chip | Operation Data |
|---|---|---|---|
| 2 | Y | B | Y1 |
| 4 | X | B | X2 |
| 7 | X | B | X3 |

| Timestamp | Operation Type | Target Chip | Operation Data |
|---|---|---|---|
| 6 | Z | C | Z2 |

| Timestamp | Operation Type | Target Chip | Operation Data |
|---|---|---|---|
| 1 | X | A | X1 |
| 3 | Y | B | Y1 |
| 4 | X | B | X2 |
| 6 | Z | A | Z1 |
| 7 | Y | A | Y2 |
| 8 | Z | C | Z2 |
| 9 | X | B | X3 |

| Timestamp | Operation Type | Target Chip | Operation Data |
|---|---|---|---|
| 1 | X | A | X1 |
| 6 | Z | A | Z1 |
| 7 | Y | A | Y2 |

| Timestamp | Operation Type | Target Chip | Operation Data |
|---|---|---|---|
| 3 | Y | B | Y1 |
| 4 | X | B | X2 |
| 9 | X | B | X3 |

| Timestamp | Operation Type | Target Chip | Operation Data |
|---|---|---|---|
| 8 | Z | C | Z2 |

METHOD TO VERIFY CORRECTNESS OF COMPUTER SYSTEM SOFTWARE AND HARDWARE COMPONENTS AND CORRESPONDING TEST ENVIRONMENT

PRIOR FOREIGN APPLICATION

This application claims priority from United Kingdom patent application Serial No. GB 1304892.1, filed Mar. 18, 2013, which is hereby incorporated herein by reference in its entirety.

FIELD OF THE INVENTION

The present invention relates in general to the field of function verification of hardware and/or software components, and in particular to a method to verify correctness of computer system software and hardware components and a corresponding test environment. Still more particularly, the present invention relates to a data processing program and a computer program product to verify correctness of computer system software and hardware components.

BACKGROUND

During development of hardware chips for system servers, like System z® servers of the applicant, International Business Machines Corporation, of Armonk, N.Y., USA, each chip is simulated and verified in different environments before it is physically manufactured. The simulation or test environments differ in the level of detail, the scope e.g. multi chip versus single chip models, and the ecosystem where the simulation is executed. To initialize a system server, a complex sequence for each of its chips is needed. As the simulation or test environments are very different, the languages to formulate initialization sequences are also very different. Therefore the initialization sequences are manually rewritten during the transition from one environment to the next. This process is error prone.

During system hardware bring up different simulation models are used on different levels and environments to verify chip initialization sequences. When changing the simulation model it needs to be guaranteed that the initialization sequences do not inadvertently change also. This is currently not possible in an automated fashion.

In U.S. Pat. No. 6,285,914 B1, a chip verification method by comparing internal state traces of chips having various functions is disclosed. The disclosed chip verification method is capable of reducing the overall chip designing and verifying time and attaining a more exact verification. The disclosed chip verification method in a chip design stage includes a first step of executing an application program for each of a target system having a target chip and a system having a function verification chip model of a design stage, using a virtual system modeled by a hardware description language, a second step of storing an internal state of the target chip on a command-by-command basis during execution of the application program and generating a trace file, a third step of comparing the internal state of the target chip stored at the trace file and an internal state of the function verification chip model on a command-by-command basis; and a fourth step of continuing execution of the program if the respective internal states are the same from the above comparison result, and if different, outputting the internal state and ending execution. However the disclosed chip verification method is not capable to show the functional equivalence of a system with multiple chips.

BRIEF SUMMARY

Provided herein, in one aspect, is a method to verify correctness of computer system software and hardware components by comparing a modified system software and/or hardware version of the computer with a verified system software and hardware version of the computer, which is assumed to work correctly using a test environment, which comprises an execution environment running a verified or modified system software version connected to a verified or modified hardware model or hardware system version of the computer, wherein the computer comprises at least one chip. The method includes: operating the test environment with the verified system software and hardware version; monitoring and recording each hardware access during operation of the test environment with the verified system software and hardware version to generate a corresponding verified trace file; operating the test environment with the modified system software and/or hardware version; monitoring and recording each hardware access to generate a corresponding new trace file during operation of the test environment with the modified system software and/or hardware version; defining an arbitrary order for target chips in the verified and the modified hardware model or hardware system version; sorting sequences of entries in both trace files according to the target chip order; and comparing the sorted trace files by comparing their entries each by each and outputting a corresponding comparison result.

The above, as well as additional purposes, features, and advantages of the present invention will become apparent in the following detailed written description.

BRIEF DESCRIPTION OF THE SEVERAL VIEWS OF THE DRAWINGS

Embodiments of the present invention, as described in detail below, are shown in the drawings, in which:

FIG. 4 is a schematic diagram of a verified access trace file, in accordance with one or more aspects of the present invention;

FIG. 5 is a schematic diagram of a split verified access trace file for a first target chip, in accordance with one or more aspects of the present invention;

FIG. 6 is a schematic diagram of a split verified access trace file for a second target chip, in accordance with one or more aspects of the present invention;

FIG. 7 is a schematic diagram of a split verified access trace file for a third target chip, in accordance with one or more aspects of the present invention;

FIG. 8 is a schematic diagram of a new access trace file, in accordance with one or more aspects of the present invention;

FIG. 9 is a schematic diagram of a split new access trace file for the first target chip, in accordance with one or more aspects of the present invention;

FIG. 10 is a schematic diagram of a split new access trace file for the second target chip, in accordance with one or more aspects of the present invention;

FIG. 11 is a schematic diagram of a split verified access trace file for the third target chip, in accordance with one or more aspects of the present invention.

DETAILED DESCRIPTION

Figure 1:
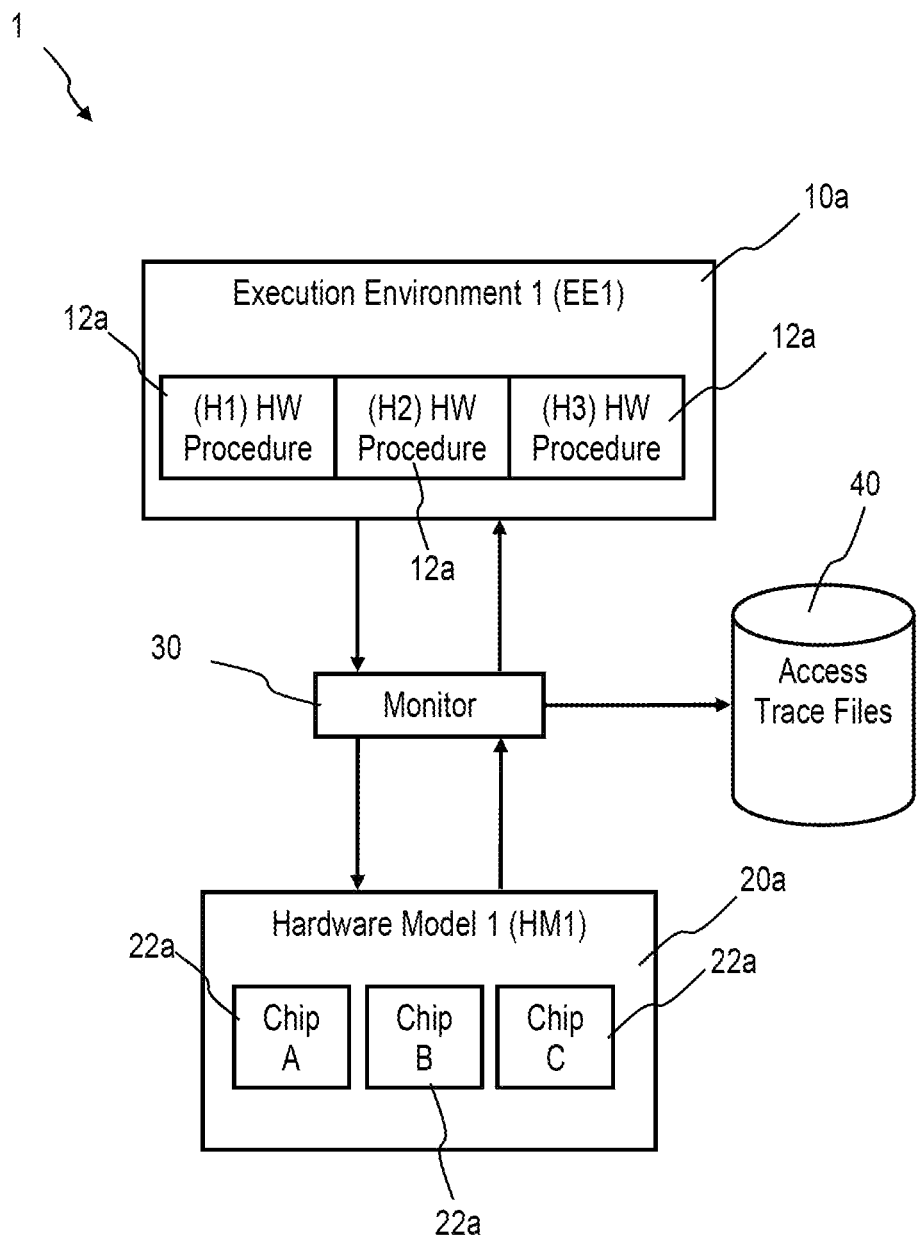
FIG. 1 is a schematic block diagram of a test environment, in accordance with one or more aspects of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
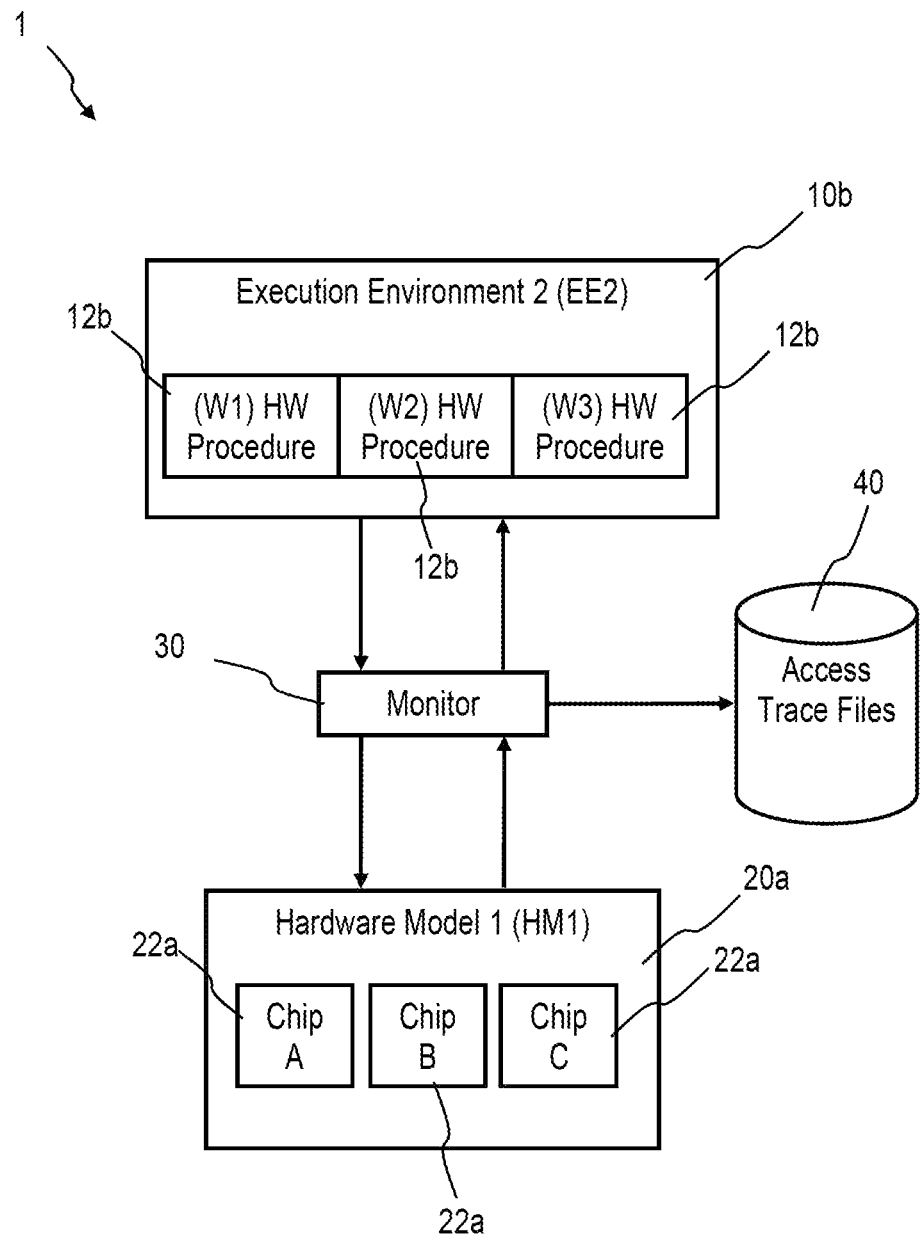
FIG. 2 is a schematic block diagram of a test environment, in accordance with one or more aspects of the present invention.
Figure 3:
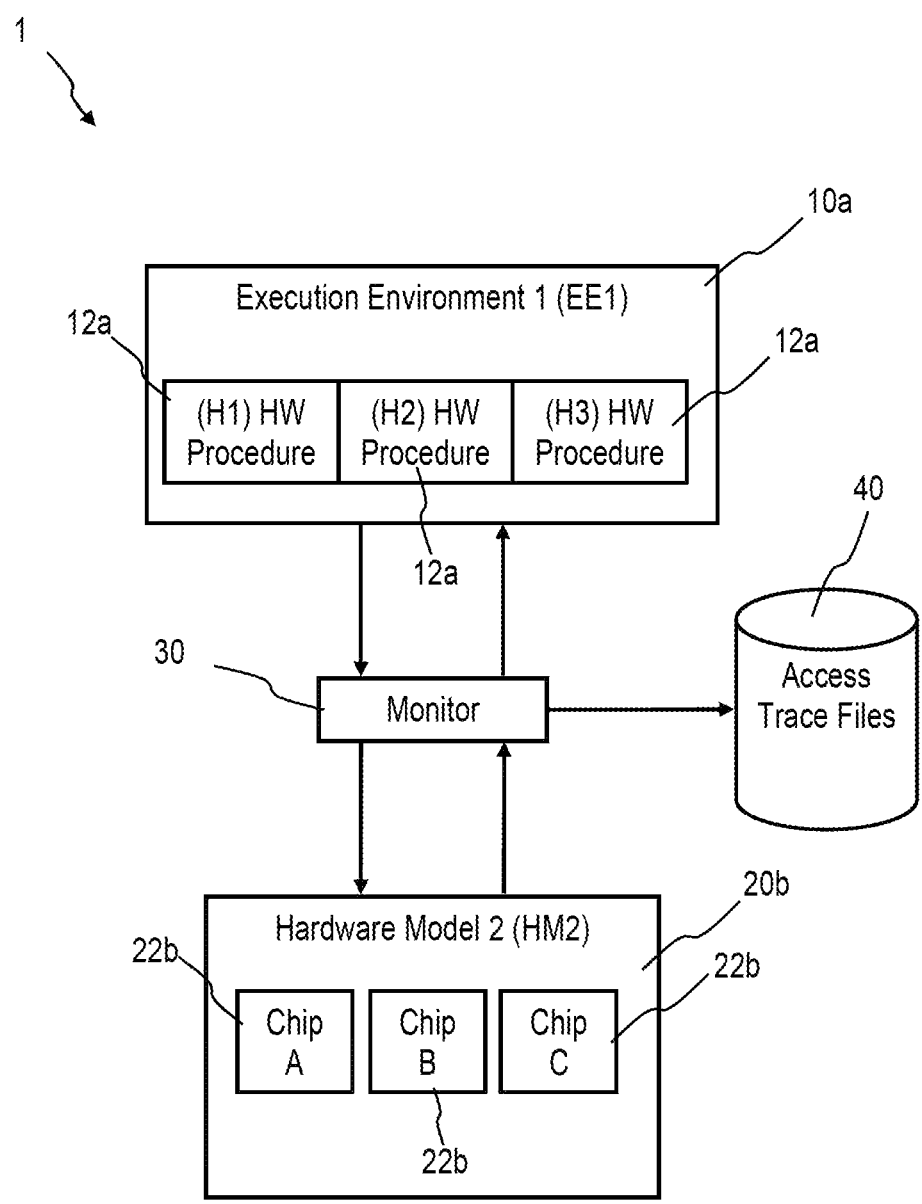
FIG. 3 is a schematic block diagram of a test environment, in accordance with one or more aspects of the present invention.

FIG. 1 shows a test environment, in accordance with a first embodiment of the present invention; FIG. 2 shows a test environment, in accordance with a second embodiment of the present invention; and FIG. 3 shows a test environment, in accordance with a third embodiment of the present invention.

A system server like the System z® server of International Business Machines Corporation is a complex system which includes several individual hardware chips which interact together. When such a server is powered on all of its chips need to be initialized into a defined state before an operating system can be loaded. For some chips the initialization sequence is implemented in the chip itself and the only external trigger to start it is to toggle a reset pin. For other chips the initialization sequence has to be applied externally over the out of band interface of the chip. Those sequences need to be simulated and verified.

The simulation of a chip is not just one monolithic process. There are rather many simulation environments which differ in the level of detail, the scope (e.g. multi-chip versus single chip models) and the ecosystem where the simulation is executed. As the simulation environments are very different, the language to formulate initialization sequences is also different. This fact requires the initialization sequences to be translated when switching between simulation environments. This translation is usually done manually since it is not straightforward as explained in the following.

In case of multi-chip models, the initialization sequences for chips are typically not independent and require synchronization. For example, a chip A may have to be initialized up to a certain state before the initialization of chip B can start. The simplest way to meet those synchronization requirements is to divide the chip initialization sequences at the synchronization points and order those subsequences into one large system initialization sequence. Another approach is to run the chip initialization sequences in parallel with explicit synchronization points. It is obvious that the two approaches result in quite different implementations.

The manual translation of initialization sequences is error prone. If an error was inadvertently introduced in a translated initialization sequence, it is time consuming and costly to find it by checking the output patterns of simulation runs. Instead of checking the output patterns of simulation, embodiments of the present invention record the input patterns to a simulation model in a common format. If a translated initialization sequence results in the same input patterns as the original sequence, then this proves that no error was introduced during the manual translation.

Referring to FIGS. 1 to 3, the shown embodiments of the present invention employ a test environment 1 to verify correctness of computer system software and hardware components by comparing a modified system software and/or hardware version with a verified system software and hardware version which is assumed to work correctly. The test environment 1 comprises an execution environment 10a, 10b running a verified or modified system software version connected to a verified or modified hardware model 20a, 20b or hardware system of the computer system comprising at least one chip 22a, 22b. Further the test environment 1 comprises means 30 for monitoring communication between the execution environment 10a, 10b and the hardware models 20a, 20b or hardware systems. The test environment 1 generates a corresponding verified trace file T , an example of such a verified trace file T1 is shown in FIG. 4, by operating the execution environment 10a connected to the verified hardware model 20a or hardware system with the verified system software version and using the monitoring means 30 to monitor and record each hardware access during operation of the execution environment 10a with the verified system software version. Further the test environment 1 generates a corresponding new trace file T2 , an example of such a new trace file T2 is shown in FIG. 8; by operating the execution environment 10a connected to the modified hardware model 20b with the verified system software version, or by operating the execution environment 10b connected to the verified hardware model 20a with the modified system software version, and using the monitoring means 30 to monitor and record each hardware access during operation of said execution environment 10a, 10b. The test environment 1 defines an arbitrary order for the target chips A, B, C in the verified and the modified hardware model 20a, 20b or hardware system version, sorts sequences of entries in both trace files T1 , T2 according to the target chip order, compares the sorted trace files T1 , T2 by comparing their entries each by each, and outputs a corresponding comparison result.

In the shown embodiments of the invention the monitoring means 30 writes the trace files T1 , T2 to data storage 40.

Referring to FIG. 1, the shown embodiment of the present invention employs a first type of execution environment 10a which runs a so called "golden system software version" or verified system software which is assumed to work correctly and uses three hardware procedures H1, H2, H3 to initialize three corresponding target chips A, B, C in the verified hardware model 20a or hardware system to generate the verified trace file T1.

Still referring to FIG. 1, the shown test environment 1 comprises a logic VHDL model HM1 of a system consisting of three chips A, B, C which could be implemented as storage controller chip, central processor chip, memory chip, for example. The execution environment 10a is a Linux execution environment EE1, for example, which generates the input patterns to the VHDL model HM1. Each hardware procedure H1, H2, H3 represents an initialization sequence which is run in parallel to each other.

Referring to FIG. 2, the shown embodiment of the present invention employs a second type of execution environment 10b which runs modified system software which uses three hardware procedures W1, W2, W3 to initialize the three corresponding target chips A, B, C in the verified hardware model 20a or hardware system to generate the new trace file T2.

Still referring to FIG. 2, the shown test environment 1 comprises the logic VHDL model HM1 of FIG. 1. The execution environment 10b is also Linux execution environment EE2, for example, which generates the input patterns to the VHDL model HM1. Each hardware procedure W1, W2, W3 represents a modified initialization sequence which is run in parallel to each other.

Referring to FIG. 3, the shown embodiment of the present invention employs the first type of execution environment 10a which runs the verified system software which is assumed to work correctly and uses the three hardware procedures H1, H2, H3 to initialize three corresponding target chips A, B, C in a modified hardware model 20b or hardware system to generate the new trace file T2.

Still referring to FIG. 3, the shown test environment 1 comprises a modified logic VHDL model HM2 of a system consisting of the three chips A, B, C which could be implemented as storage controller chip, central processor chip, memory chip, for example.

Alternatively in an embodiment of the present invention not shown, the second type of execution environment 10b runs the modified system software and uses at least one hardware procedure 12b to initialize at least one corresponding target chip A, B, C in the modified hardware model 20b or hardware.

Again referring to FIGS. 1 to 3, in all shown embodiments the monitor block 30 of the test environment 1 intercepts each input pattern and writes a record consisting of the following items to an access trace file which is stored in the data storage 40. The record comprises information about operation type, operation data, target chip and timing. The out of band interface of a chip A, B, C usually supports different type of operations, e.g. read or write a register, so the actual type of operation is recorded. The information about the operation data comprises the register number for a read operation, for example. The target chip information defines to which chip A, B, C in the model HM1 the operation should be routed to. The timing information comprises a timestamp, for example. This allows evaluating a timing order of the performed operations.

FIG. 4 shows a verified access trace file T1, in accordance with an embodiment of the present invention generated by the test environment 1 shown in FIG. 1; FIG. 5 shows a split verified access trace file T1A for the first target chip A, in accordance with an embodiment of the present invention; FIG. 6 shows a split verified access trace file T1B for the second target chip B, in accordance with an embodiment of the present invention; and FIG. 7 shows a split verified access trace file T1C for the third target chip C, in accordance with an embodiment of the present invention.

FIG. 8 shows a new access trace file T2, in accordance with an embodiment of the present invention generated by the test environment 1 shown in FIG. 2 or 3; FIG. 9 shows a split new access trace file T2A for the first target chip A, in accordance with an embodiment of the present invention; FIG. 10 shows a split new access trace file T2B for the second target chip B, in accordance with an embodiment of the present invention; and FIG. 11 shows a split new access trace file T2C for the third target chip C, in accordance with an embodiment of the present invention.

FIG. 4 shows possible content for the verified access trace file T1 containing operations to target chips A, B and C. FIG. 8 shows possible content for the new access trace file T2 containing operations to target chips A, B and C. The verified trace file T1 and the new trace file T2 each comprise operation type, operation data, target chip identification and timestamp as entries for each hardware access. The content of them is not the same since the timestamp differ and also the operations to chips A, B, C are executed in different orders.

As the next step the trace files T1 and T2 are split into separate trace files per target chip A, B, C to ease the comparison process, so one for chip A, chip B and chip C named T1A, T1B, T1C for the verified access trace file T1 and T2A, T2B, T2C for the new access trace file T2. Then the timestamp is removed and the trace files are compared for each target chip A, B, C. So split verified access trace file T1A is compared against split new access trace file T2A and so forth. This eventually results in a match which proves that the initialization sequences for the modified system software and/or hardware version of the computer and the verified system software and hardware version of the computer which is assumed to work correctly are identical.

Figure 12:
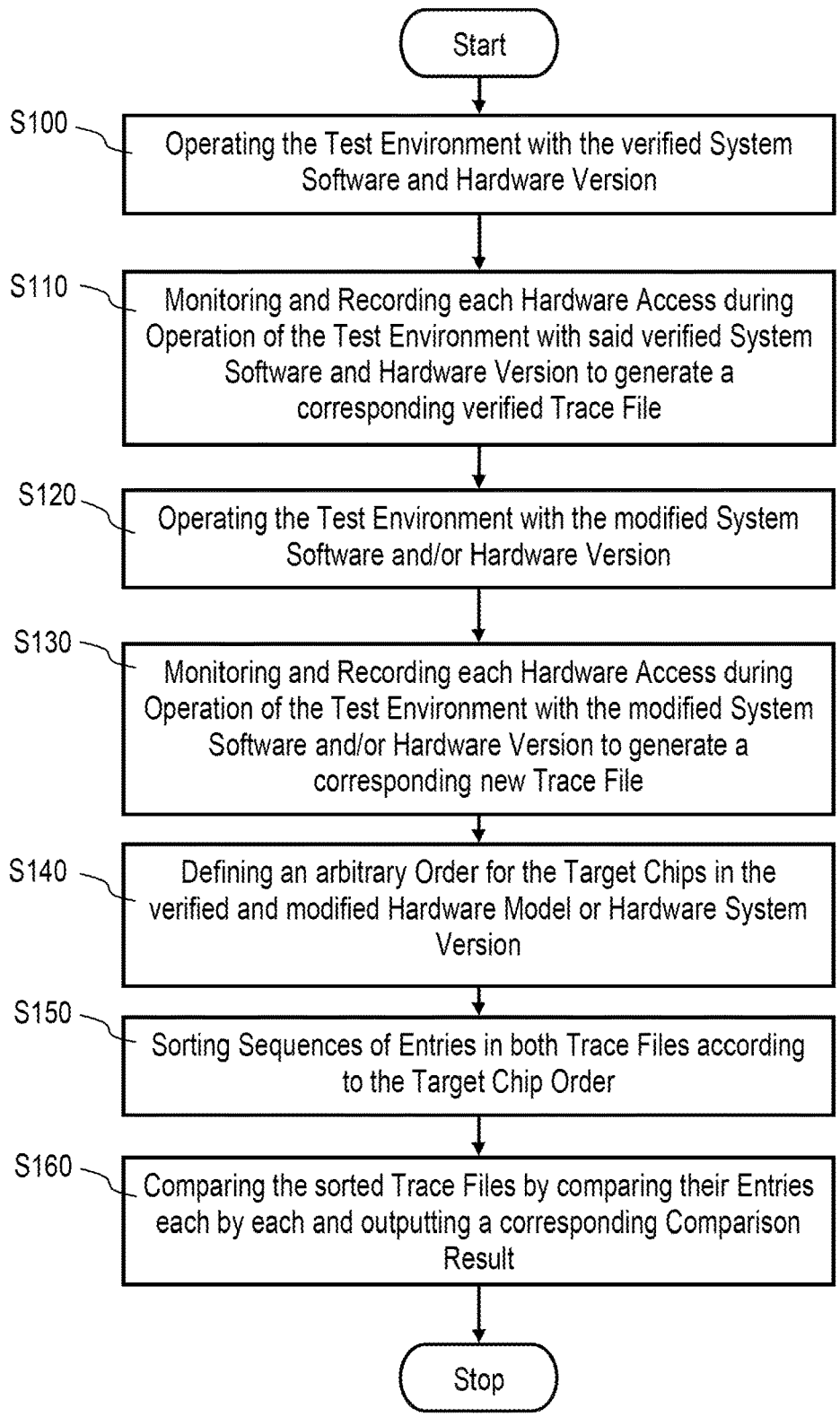
FIG. 12 is a schematic flow diagram of a method to verify correctness of computer system software and hardware components, in accordance with one or more aspects of the present invention.

FIG. 12 is a schematic flow diagram of a method to verify correctness of computer system software and hardware components, in accordance with an embodiment of the present invention.

Referring to FIG. 12, in step S100 the test environment is operated with the verified system software and hardware version of the computer which is assumed to work correctly. In step S110 each hardware access during operation of the test environment 1 with the verified system software and hardware version is monitored and recorded to generate a corresponding verified trace file T1. In step S120 the test environment 1 is operated with the modified system software and/or hardware version. In step S130 each hardware access is monitored and recorded to generate a corresponding new trace file T2 during operation of the test environment 1 with the modified system software and/or hardware version. In step S140 an arbitrary order for the target chips A, B, C in the verified and the modified hardware model 20a, 20b or hardware system version is defined. In step S150 sequences of entries in both trace files T1, T2 are sorted according to the target chip order. In step S160 the sorted trace files T1, T2 are compared by comparing their entries each by each and a corresponding comparison result is output.

The verified trace file T1 is split into verified separate trace files T1A, T1B, T1C per target chip A, B, C, and the new trace file T2 is split into new separate trace files T2A, T2B, T2C per target chip A, B, C before the comparing process. Further the verified separate trace files T1A, T1B, T1C and the new separate trace files T2A, T2B, T2C are sorted according to the timing information. Then the timing information is removed from the verified separate trace files T1A, T1B, T1C and the new separate trace files T2A, T2B, T2C.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In summary, the technical problem underlying the present invention is to provide a method to verify correctness of computer system software and hardware components and a corresponding test environment, which are able to verify equivalence of chip interactions in different hardware models and to solve the above mentioned shortcomings and pain points of prior art verification of correctness of computer system software and hardware components.

According to the present invention this problem is solved by providing a method to verify correctness of computer system software and hardware components, a test environment, a data processing program to verify correctness of computer system software and hardware components, and a computer program product to verify correctness of computer system software and hardware components.

Accordingly, in an embodiment of the present invention a method to verify correctness of computer system software and hardware components by comparing a modified system software and/or hardware version of the computer with a verified system software and hardware version of the computer which is assumed to work correctly using a test environment, which comprises an execution environment running a verified or modified system software version connected to a verified or modified hardware model or hardware system version of the computer comprising at least one chip, comprises the steps of: Operating the test environment with the verified system software and hardware version; monitoring and recording each hardware access during operation of the test environment with the verified system software and hardware version to generate a corresponding verified trace file; operating the test environment with the modified system software and/or hardware version; monitoring and recording each hardware access to generate a corresponding new trace file during operation of the test environment with the modified system software and/or hardware version; defining an arbitrary order for target chips in the verified and the modified hardware model or hardware system version; sorting sequences of entries in both trace files according to the target chip order; comparing the sorted trace files by comparing their entries each by each and outputting a corresponding comparison result.

In further embodiments of the present invention, a first type of execution environment runs the verified system software and uses at least one hardware procedure to initialize at least one corresponding target chip in the verified hardware model or hardware system during operation of the test environment with the verified system software and hardware version.

In further embodiments of the present invention, a second type of execution environment runs the modified system software and uses at least one hardware procedure to initialize at least one corresponding target chip in the verified hardware model or hardware system during operation of the test environment with the modified system software and the verified hardware version.

In further embodiments of the present invention, a first type of execution environment runs the verified system software and uses at least one hardware procedure to initialize at least one corresponding target chip in the modified hardware model or hardware system during operation of the test environment with the verified system software and the modified hardware version.

In further embodiments of the present invention, the verified trace file and the new trace file each comprise operation type, operation data, target chip identification and timing information as entries for each hardware access.

In further embodiments of the present invention, the verified trace file is split into verified separate trace files per target chip, and the new trace file is split into new separate trace files per target chip before the comparing process.

In further embodiments of the present invention, the verified trace file and the new trace file or the verified separate trace files and the new separate trace files are sorted according to the timing information.

In further embodiments of the present invention, the timing information is removed from the verified trace file and the new trace file or the verified separate trace files and the new separate trace files after sorting.

In another embodiment of the present invention, a test environment to verify correctness of computer system software and hardware components by comparing a modified system software and/or hardware version with a verified system software and hardware version which is assumed to work correctly; comprises an execution environment running a verified or modified system software version connected to a verified or modified hardware model or hardware system of the computer system comprising at least one chip; and means for monitoring communication between the execution environment and the hardware models or hardware systems; wherein the test environment generates a corresponding verified trace file by operating the execution environment connected to the verified hardware model or hardware system with the verified system software version and using the monitoring means to monitor and record each hardware access during operation of the execution environment with the verified system software version; wherein the test environment generates a corresponding new trace file by operating the execution environment connected to the modified hardware model with the verified system software version, or by operating the execution environment connected to the verified hardware model with the modified system software version, and using the monitoring means to monitor and record each hardware access during operation of the execution environment; wherein the test environment defines an arbitrary order for target chips in the verified and the modified hardware model or hardware system version, sorts sequences of entries in both trace files according to the target chip order, compares the sorted trace files by comparing their entries each by each, and outputs a corresponding comparison result.

In further embodiments of the present invention, the monitoring means writes the trace files to data storage.

In further embodiments of the present invention, a first type of execution environment runs the verified system software and uses at least one hardware procedure to initialize at least one corresponding target chip in the verified or modified hardware model or hardware system.

In further embodiments of the present invention, a second type of execution environment runs the modified system software and uses at least one hardware procedure to initialize at least one corresponding target chip in the verified hardware model or hardware.

In further embodiments of the present invention, the verified trace file and the new trace file each comprise the following entries: Information to identify the affected target chip; information about an affected register in the target chip; operation type information; information about operation data transferred to or obtained from the affected register; and timing information for each hardware access, wherein the test environment sorts the verified trace file and the new trace file according to the timing information, and removes the timing information from the verified trace file and the new trace file after sorting, and wherein the test environment splits the verified trace file into verified separate trace files per target chip, and splits the new trace file into new separate trace files per target chip before the comparing process.

In another embodiment of the present invention, a data processing program for execution in a data processing system comprises software code portions for performing a method to verify correctness of computer system software and hardware components when the program is run on the data processing system.

In yet another embodiment of the present invention, a computer program product stored on a computer-usable medium, comprises computer-readable program means for causing a computer to perform a method to verify correctness of computer system software and hardware components when the program is run on the computer.

All in all, embodiments of the present invention record interactions with the target chip in a common format for each environment and offer a mechanism to verify equivalence of chip interactions in different hardware models. With an intelligent comparison of the recorded interactions it is possible to check if the interactions are functionally equivalent between two simulation or test environments. In contrast to known solution this also works for multi-chip environments where chips can be initialized in parallel.

One aspect of the present invention is to introduce a monitor entity which records each hardware access and writes it into a corresponding access trace file. Each recorded hardware access contains information about operation type, operation data, target chip, and timing information like a timestamp to evaluate an order of the hardware accesses.

Embodiments of the present invention use at least one hardware procedure to initialize at least one corresponding target chip in the verified or modified hardware model or hardware system during operation of the test environment. A hardware procedure is a program which initiates a sequence of hardware accesses, like read and/or write processes, and interprets the results. The implementation of hardware procedures differs per execution environment. The hardware procedures can interact with more than one target chip.

Further embodiments of the present invention offer the advantage of automatic rather than manual verification that chip initialization sequences remain the same when changing the simulation or test environment, apply to all environments where hardware accesses can be monitored and are independent of the order how distinct targets are initialized parallel versus sequential.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of facilitating computer system processing, the method comprising:
    enhancing computer system test processing by establishing functional correctness of computer system components by comparing in operation a modified system version of a computer system with a verified system version of the computer system which functions correctly within a test environment, the test environment including an execution environment for running the modified system version and for running the verified system version, which are different system versions, each system version comprising computer software components connected to computer hardware components, the computer hardware components comprising multiple target chips, the multiple target chips comprising a number of target chips which is consistent between each version, the establishing functional correctness being performed within the test environment and comprising:
        operating said test environment with said verified system version;
        monitoring and recording each hardware access during operation of said test environment with said verified system version to generate a corresponding verified trace file;
        operating said test environment with said modified system version;
        monitoring and recording each hardware access to generate a corresponding new trace file during operation of said test environment with said modified system version;
        defining an arbitrary chip order for evaluation of operations to the multiple target chips in said verified system version and the multiple target chips of the modified system version;
        sorting sequences of entries in both trace files according to said arbitrary chip order, including splitting the trace files into separate chip-based trace files;
        comparing said sorted, chip-based trace files by comparing, for each chip, their entries each by each to compare patterns of operations to the multiple target chips between the verified system version and the modified system version, and thus initialization sequences of the multiple target chips using the verified system version and the modified system version; and
        identifying functional correctness of the computer system components based on initialization sequences of the multiple target chips in the verified system version and in the modified system version matching.

2. The method according to claim 1, wherein a first type of execution environment runs verified system software of the verified system version and uses at least one hardware procedure to initialize at least one corresponding target chip in said verified system version during operation of said test environment with said verified system version.

3. The method according to claim 1, wherein a second type of execution environment runs modified system software of the modified system version and uses at least one hardware procedure to initialize at least one corresponding target chip in said verified system version during operation of said test environment with said modified system version.

4. The method according to claim 1, wherein a first type of execution environment runs verified system software of the verified system version and uses at least one hardware procedure to initialize at least one corresponding target chip in said modified system version during operation of said test environment with said verified system version.

5. The method according to claim 4, wherein said verified trace file and said new trace file each comprise operation type, operation data, target chip identification and timing information as entries for each hardware access.

6. The method according to claim 1, wherein said verified trace file and said new trace file or said verified separate trace files and said new separate trace files are sorted according to timing information.

7. The method according to claim 6, wherein said timing information is removed from said verified trace file and said new trace file or said verified separate trace files and said new separate trace files after sorting.

8. The method of claim 1, wherein:
    said verified trace file and said new trace file each comprise timing information as entries for each hardware access;
    said sorting further comprising sorting entries in the separate chip-based trace files according to said timing information; and
    subsequent to the sorting, removing the timing information from the separate chip-based trace files.

9. A system of facilitating computer system processing, the system comprising:
    a memory; and
    a processor communicatively coupled to the memory, the system performing:
        enhancing computer system test processing by establishing functional correctness of computer system components by comparing in operation a modified system version of a computer system with a verified system version of the computer system which functions correctly within a test environment, the test environment including an execution environment for running the modified system version and for running the verified system version, which are different system versions, each version comprising computer software components connected to computer hardware components, the computer hardware components comprising multiple target chips, the multiple target chips comprising a number of target chips which is consistent between each version, the establishing functional correctness being performed within the test environment and comprising:
            operating said test environment with said verified system version;

monitoring and recording each hardware access during operation of said test environment with said verified system version to generate a corresponding verified trace file;
operating said test environment with said modified system version;
monitoring and recording each hardware access to generate a corresponding new trace file during operation of said test environment with said modified system version;
defining an arbitrary chip order for evaluation of operations to the multiple target chips in said verified system version and the multiple target chips of the modified system version;
sorting sequences of entries in both trace files according to said arbitrary chip order, including splitting the trace files into separate chip-based trace files;
comparing said sorted, chip-based trace files by comparing, for each chip, their entries each by each to compare patterns of operations to the multiple target chips between the verified system version and the modified system version, and thus initialization sequences of the multiple target chips using the verified system version and the modified system version; and
identifying functional correctness of the computer system components based on initialization sequences of the multiple target chips in the verified system version and in the modified system version matching.

10. The system according to claim 9, wherein the system further performs writing the trace files to a data storage.

11. The system according to claim 10, wherein a first type of execution environment runs verified system software of the verified system version and uses at least one hardware procedure to initialize at least one corresponding target chip of said multiple target chips.

12. The system according to claim 10, wherein a second type of execution environment runs modified system software of the modified system version and uses at least one hardware procedure to initialize at least one corresponding target chip of said multiple target chips.

13. The system according to claim 12, wherein said verified trace file and said new trace file each comprise the following entries: information to identify said affected target chip; information about an affected register in said target chip; operation type information; information about operation data transferred to or obtained from said affected register; and timing information for each hardware access, wherein the execution environment sorts said verified trace file and said new trace file according to said timing information, and removes said timing information from said verified trace file and said new trace file after sorting, and wherein said test environment splits said verified trace file into verified separate trace files per target chip, and splits said new trace file into new separate trace files per target chip before said comparing process.

14. The system of claim 9, wherein:
said verified trace file and said new trace file each comprise timing information as entries for each hardware access;
said sorting further comprising sorting entries in the separate chip-based trace files according to said timing information; and
subsequent to the sorting, removing the timing information from the separate chip-based trace files.

15. A computer program product for facilitating computer system processing, the computer program product comprising:
a computer-readable storage medium readable by a processor and storing instructions for execution by the processor for performing a method comprising:
enhancing computer system test processing by establishing functional correctness of computer system components by comparing in operation a modified system version of a computer system with a verified system version of the computer system which functions correctly within a test environment, the test environment including an execution environment for running the modified system version and for running the verified system version, which are different system versions, each system version comprising computer software components connected to computer hardware components, the computer hardware components comprising multiple target chips, the multiple target chips comprising a number of target chips which is consistent between each version, the establishing functional correctness being performed within the test environment and comprising:
operating said test environment with said verified system version;
monitoring and recording each hardware access during operation of said test environment with said verified system version to generate a corresponding verified trace file;
operating said test environment with said modified system version;
monitoring and recording each hardware access to generate a corresponding new trace file during operation of said test environment with said modified system version;
defining an arbitrary chip order for evaluations of operations to the multiple target chips in said verified system version and the multiple target chips of the modified system version;
sorting sequences of entries in both trace files according to said arbitrary chip order, including splitting the trace files into separate chip-based trace files; and
comparing said sorted, chip-based trace files by comparing, for each chip, their entries each by each to compare patterns of operations to the multiple target chips between the verified system version and the modified system version, and thus initialization sequences of the multiple target chips using the verified system version and the modified system version; and
identifying functional correctness of the computer system components based on initialization sequences of the multiple target chips in the verified system version and in the modified system version matching.

16. The computer program product of claim 15, wherein:
said verified trace file and said new trace file each comprise timing information as entries for each hardware access;
said sorting further comprising sorting entries in the separate chip-based trace files according to said timing information; and
subsequent to the sorting, removing the timing information from the separate chip-based trace files.

* * * * *